United States Patent
Gebert et al.

(10) Patent No.: US 7,513,325 B2
(45) Date of Patent: Apr. 7, 2009

(54) METHOD FOR OPERATING A HYBRID MOTOR VEHICLE

(75) Inventors: Juergen Gebert, Moosburg (DE); Marcel Fenkart, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 177 days.

(21) Appl. No.: 11/600,196

(22) Filed: Nov. 16, 2006

(65) Prior Publication Data

US 2007/0062745 A1    Mar. 22, 2007

Related U.S. Application Data

(63) Continuation of application No. PCT/EP2005/005563, filed on May 23, 2005.

(30) Foreign Application Priority Data

May 25, 2004    (DE)    ........................ 10 2004 025 460

(51) Int. Cl.
B60K 6/00    (2007.10)
(52) U.S. Cl. ..................... 180/65.3; 180/65.4; 903/941; 903/942; 701/22
(58) Field of Classification Search ................ 180/65.2, 180/65.3, 65.4; 903/940, 941, 942, 943; 701/22
See application file for complete search history.

(56) References Cited

U.S. PATENT DOCUMENTS

| | | | |
|---|---|---|---|
| 4,407,132 A | 10/1983 | Kawakatsu et al. | |
| 5,251,588 A | 10/1993 | Tsujii et al. | |
| 5,318,142 A * | 6/1994 | Bates et al. ................ | 180/65.2 |
| 5,469,816 A | 11/1995 | Murakawa et al. | |
| 6,378,636 B1 | 4/2002 | Worrel | |
| 6,408,968 B1 | 6/2002 | Wakashiro et al. | |
| 6,424,053 B1 | 7/2002 | Wakashiro et al. | |
| 6,612,386 B2 * | 9/2003 | Tamai et al. ................ | 180/65.4 |

(Continued)

FOREIGN PATENT DOCUMENTS

DE    40 40 310 A1    7/1992

(Continued)

OTHER PUBLICATIONS

International Search Report dated Aug. 19, 2005 including English translation of relevant portion (six (6) pages).

(Continued)

*Primary Examiner*—Christopher P Ellis
*Assistant Examiner*—John D Walters
(74) *Attorney, Agent, or Firm*—Crowell & Moring LLP

(57) ABSTRACT

In a method for operating a hybrid vehicle, which includes an internal combustion engine and an electric machine as the propulsive drive, the electric machine operates in both motor and generator modes. Furthermore, there is an accumulator device, such as a capacitor assembly, for storing electric energy. The aim is to provide a method that guarantees an improved start-up operation of a hybrid motor vehicle in terms of fuel consumption and emission. This is achieved in that in the start-up operation the torque required on the basis of the request of the driver to drive the vehicle is divided between the internal combustion engine and the electric machine, as a function of the existing operating parameters of the vehicle.

13 Claims, 1 Drawing Sheet

U.S. PATENT DOCUMENTS

| | | | |
|---|---|---|---|
| 6,769,389 B2 * | 8/2004 | Tamai et al. | 123/179.3 |
| 7,077,224 B2 * | 7/2006 | Tomatsuri et al. | 180/65.3 |
| 2001/0032621 A1 | 10/2001 | Kojima et al. | |
| 2002/0179347 A1 | 12/2002 | Tamai et al. | |
| 2002/0179348 A1 * | 12/2002 | Tamai et al. | 180/65.2 |
| 2003/0021876 A1 | 1/2003 | McArdle et al. | |

FOREIGN PATENT DOCUMENTS

| | | |
|---|---|---|
| DE | 43 24 010 A1 | 1/1995 |
| DE | 44 30 670 A1 | 3/1995 |
| DE | 44 22 647 A1 | 1/1996 |
| DE | 100 40 198 A1 | 3/2001 |
| DE | 100 49 510 A1 | 5/2001 |
| DE | 101 27 782 A1 | 1/2002 |
| DE | 101 19 475 A1 | 2/2002 |
| DE | 101 49 897 A1 | 8/2002 |
| DE | 102 22 425 A1 | 12/2002 |
| DE | 101 35 978 A1 | 2/2003 |
| DE | 102 44 159 A1 | 4/2003 |
| EP | 0 698 522 B1 | 2/1996 |
| EP | 1 182 074 A2 | 2/2002 |

OTHER PUBLICATIONS

German Office Action dated Dec. 20, 2004 with English translation of relevant portion (five (5) pages).

German Office Action dated May 2, 2005 with English translation of relevant portion (four (4) pages).

* cited by examiner

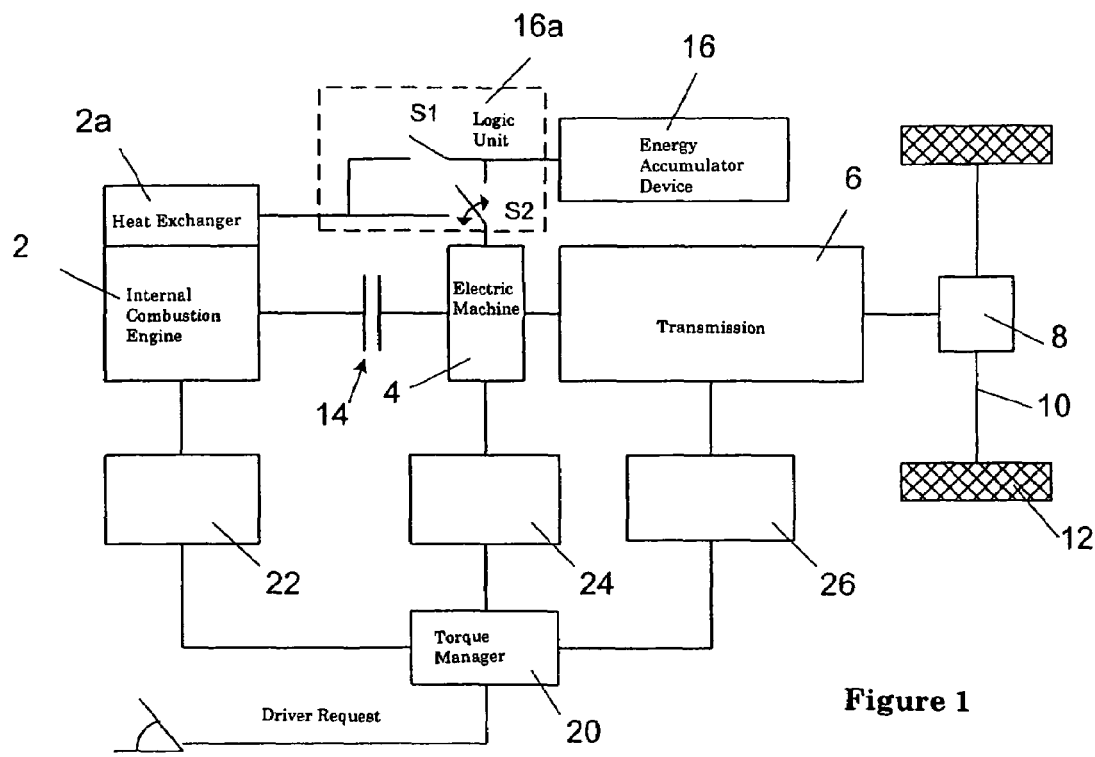
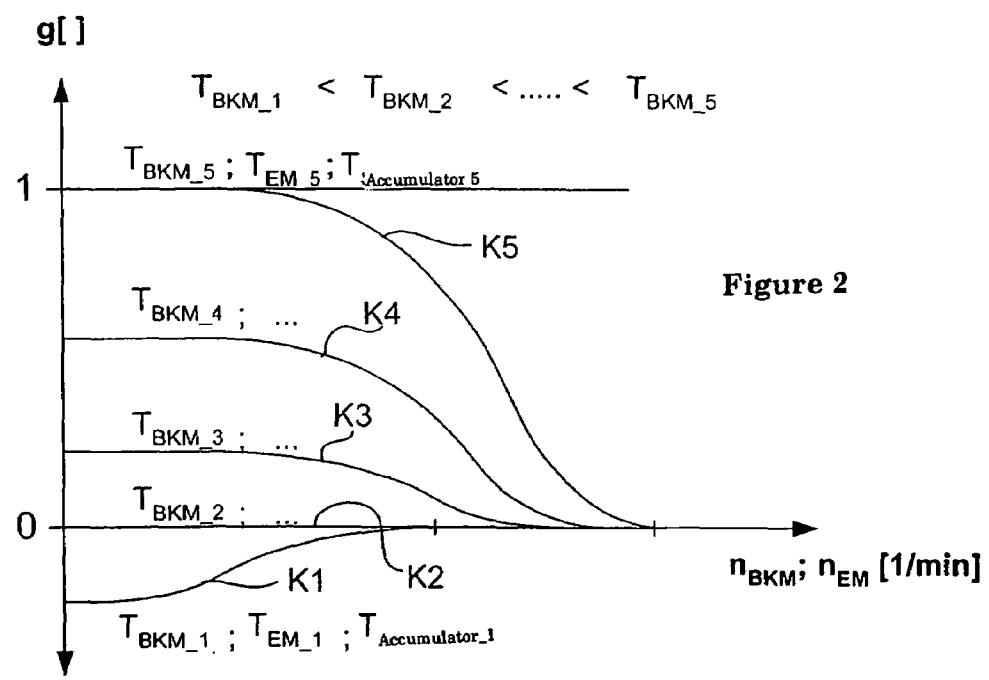

METHOD FOR OPERATING A HYBRID MOTOR VEHICLE

CROSS REFERENCE TO RELATED APPLICATIONS

This application is a continuation of PCT International Application No. PCT/EP2005/005563, filed May 23, 2005, which claims priority under 35 U.S.C. § 119 to German Patent Application No. 10 2004 025 460.5, filed May 25, 2004, the entire disclosures of which are herein expressly incorporated by reference.

BACKGROUND AND SUMMARY OF THE INVENTION

The present invention relates to a method for operating a hybrid motor vehicle.

German patent document DE 40 40 310 A1 discloses a method for operating a hybrid motor vehicle, in which the vehicle is operated exclusively by an electric motor during the start-up period of the vehicle. During start-up operation of the internal combustion engine of the vehicle, the part of the system that is connected upstream of the internal combustion engine is heated up to the operating temperature in order to guarantee a combustion with the lowest possible emission of harmful substances. After a warming-up phase, the electric engine drive is switched automatically and smoothly to an internal combustion engine drive within a very short period of time. Such a method requires electric energy to drive the vehicle in the start-up phase and to warm up the system components of the internal combustion engine. Thus, a significantly higher demand for electric energy is necessary over a longer period of time. In order to provide this higher amount of energy, as compared to conventional vehicles which are operated exclusively by an internal combustion engine, a larger energy accumulator is needed.

German patent document DE 44 22 647 A1 discloses a method for operating a hybrid vehicle, in which the required propulsion power is supplied primarily by an internal combustion engine. A portion of the required propulsion power may be supplied by an electric machine only in the event that the electric energy accumulator exhibits a sufficient charge.

The present invention provides a method for operating a motor vehicle that guarantees the lowest possible emission of harmful substances within a very short period of time. Since the torque required to drive a motor vehicle is divided as a function of the operating parameters, the fastest possible warming-up of the internal combustion engine may be guaranteed.

Below a specified threshold temperature of the internal combustion engine, the torque for driving the vehicle may be generated exclusively by the internal combustion engine. During this period of time, the electric machine may be driven by the internal combustion engine as an additional load. Therefore, the electric machine operates in a generator mode and feeds the generated electric energy into either an electric energy accumulator or a heat exchanger. The heat exchanger is heat-coupled with the internal combustion engine or proportionately into both and/or all electric consumers to be supplied with energy if desired, in addition to the energy accumulator or heat exchanger. Due to the specific additional load on the internal combustion engine, the internal combustion engine reaches a state, which exhibits an operating temperature that is optimal for burning harmful substances, within a very short period of time.

In an exemplary embodiment, the present invention provides not only the temperature of the internal combustion engine, but also the temperature of the electric machine, the temperature of the electric storage means, the rotational speed of the internal combustion engine and/or the rotational speed of the electric machine as the operating parameters, according to which the torque is divided. The operating parameters may be recorded either by measuring techniques or may be determined arithmetically with models that are stored and map the corresponding processes.

A capacitor assembly may be used in an advantageous manner as the electric accumulator. For example, high power capacitors known as "supercaps," may be used. Supercaps can supply a large amount of energy for a short period of time. Supercaps are superior to conventional batteries, because supercaps can be re-charged in a very short period of time (and are, therefore, ready again for use). Hence, supercaps may be charged up by the electric machine, which is driven in the generator mode by the internal combustion engine, and/or by recuperation during the braking operation within a very short period of time.

In another exemplary embodiment of the invention, not only the lower threshold temperature of the internal combustion engine, but also an upper threshold temperature of the internal combustion engine is determined. Below the lower threshold temperature, the hybrid vehicle is operated exclusively by the internal combustion engine. After reaching the lower threshold temperature and up to the upper threshold temperature in a mixed operation, the hybrid vehicle is operated proportionately by the internal combustion engine and by the electric machine as a function of the parameters. Above the upper threshold temperature (as far as this is possible with just the electric machine), the hybrid vehicle is operated exclusively by the electric machine. The threshold temperature values can be modified as a function of the other operating parameters (see description with respect to FIG. 2).

In accordance with exemplary embodiments of the present invention, the internal combustion engine is converted from a cold operating state (load point increase below a first threshold temperature) into a warm operating state with optimal combustion properties within a very short period of time. Furthermore, within the warm operating state of the internal combustion engine, the vehicle may be driven either partially by the electric machine (decrease in the load point above the first threshold temperature) or entirely by the electric machine alone (above a second threshold temperature). Above the second threshold temperature, the torque required by a driver's request may be converted by the electric machine alone to the extent that this torque can be generated by the electric machine. If the requested torque is so large that it cannot be converted by the electric machine alone, the internal combustion engine is switched on, at least temporarily, proportionately by way of the coupling for the purpose of generating the differential torque.

Other objects, advantages and novel features of the present invention will become apparent from the following detailed description of the invention when considered in conjunction with the accompanying drawings.

BRIEF DESCRIPTION OF THE DRAWING FIGURES

FIG. 1 is a schematic drawing of a hybrid drive for carrying out a method according to the present invention; and FIG. 2 is an illustration of a driving torque divided between an internal combustion engine and an electric machine according to the present invention.

DETAILED DESCRIPTION OF THE DRAWINGS

FIG. 1 illustrates the components of a hybrid motor vehicle. The drive train includes an internal combustion engine 2, an electric machine 4, a transmission 6 and a drive axle 10, which is driven by a differential 8 and includes two drive wheels 12, all of which are arranged one after the other in series. Inside the drive train, the internal combustion engine 2 and the electric machine 4 can be coupled together in terms of power via a coupling 14. The internal combustion engine 2 may be heat-coupled with an electrically operated heat exchanger 2a, which is disposed in the coolant circulation of the internal combustion engine 2. There is an electric accumulator device 16 for storing the electric energy and for supplying the electric machine 4 and/or the heat exchanger 2a with electric energy. The accumulator device may be constructed as a capacitor assembly, including supercaps (high power capacitors for storing large amounts of energy). Other electric consumers may be supplied with energy by a conventional battery. However, the energy may also be supplied, at least proportionately, by the capacitor assembly via a DC/DC transformer unit.

To distribute the torque, according to an exemplary embodiment of a method of the invention, there is a torque manager 20, which actuates the internal combustion engine 2 as a function of the driver's request FW (drive pedal position, throttle flap position, etc.) and as a function of the operating parameters of the vehicle. The torque manager 20 actuates the internal combustion engine 2 via a first motor control 22, the electric machine 4 via a second motor control 24, and the transmission 6 via a transmission control 26 and distributes the requested torque between the internal combustion engine 2 and the electric machine 4. In a vehicle with a manual transmission, the distribution of the torque is carried out for a gear step, as may be set in a vehicle with an automatic transmission, an optimal distribution of the torque is determined for a gear step that is determined as optimal, and the optimal gear step is set automatically to match the optimal distribution of the torque. The torque control 20, 22, 24 may be implemented by a programming technique in a motor control unit. Furthermore, the energy accumulator device 16 and/or a logic unit 16a, which is assigned to the energy accumulator device, can be actuated by way of the motor control unit in such a manner that the energy existing in the energy accumulator device 16 is distributed by the electric consumers (e.g., the electric machine 4 and the heat exchanger 2a) as a function of the charge state of the energy accumulator device 16 and as a function of the energy requirement. The logic unit 16a is also actuated correspondingly by the motor control unit for the purpose of charging up the accumulator device 16 as a function of its charge state and optionally for supplying simultaneously the heat exchanger 2a by way of the electric machine 4 that is operated in the generator mode.

In contrast to the conventional method for operating a hybrid vehicle, the electric motor 4 is used, according to the invention, for the purpose of assisting (decrease in the load point) the internal combustion engine 2, especially during the start-up phase (not only when driving away immediately upon starting the vehicle after a dead stop, but also when constantly starting up in a stop and go mode and/or, in general, upon accelerating out of low speeds). The start-up operation has a very negative impact on the consumption and the emission, but the electric machine 4 reduces the consumption and the emission. The share of the internal combustion engine 2 and the electric machine 4 in the required driving torque (driver's request) is predetermined as a function of the rotational speed $n_{EM}$ of the electric machine 4 and/or the rotational speed $n_{BKM}$ of the internal combustion engine 2 in connection with the temperature $T_{BKM\_1}, \ldots, T_{BKM\_5}$ of the internal combustion engine 2. To this end, a mapping, according to FIG. 2, is stored in a motor control unit. The sum of the partial drive torques is always predetermined by the driver's request FW. The inventive method shall be explained below with reference to FIG. 2.

FIG. 2 shows a number of curves K1, . . . K5 for dividing the torque between the internal combustion engine 2 and the electric machine 4 as a function of the operating parameters. Therefore, the distribution of the torque g is plotted on the Y axis, whereas the rotational speed $n_{BKM}$ of the internal combustion engine 2 and/or the rotational speed $n_{EM}$ of the electric machine 4 is/are plotted on the X axis, or a factor determined from these two values is mapped. The courses of the curves (curves K1, . . . , K5) which are determined by experimental techniques for the various temperatures $T_{BKM\_1}, \ldots, T_{BKM\_5}$ of the internal combustion engine 2 are drawn between these axes. The curves do not have to relate just to the temperature $T_{BKM\_1}, \ldots, T_{BKM\_5}$ of the internal combustion engine 2 alone, but may also relate to other operating parameters.

For example, the temperature of the electric machine 4 and/or the temperature of the energy accumulator device 16 and/or the rotational speed $n_{BKM}$ of the internal combustion engine 2 and/or the rotational speed $n_{EM}$ of the electric machine 4 may also be included and/or used as an alternative. The torque distribution g assumes, as a rule, a value between zero and 1, where if g=0, the drive is carried out by the internal combustion engine 2 (curve K2); if g=1, the drive is carried out exclusively by the electric machine 4 (curve K5); and at a value of 0<g<1 the drive is carried out proportionately, as a function of the operating parameters (curves K3, K4), by both machines together.

If g assumes a value of less than zero, this means that the torque of the internal combustion engine 2 is greater than the torque based on the existing request FW of the driver. Then the torque differential is compensated (curve K1) by the electric machine 4, which is operated in the generator mode. The electric energy, which is thus generated, is fed to the heat exchanger 2a for an additional heat input into the internal combustion engine 2 and/or to the energy accumulator device 16 in order to charge up the energy accumulator device 16.

The electric machine 4 may be heat-coupled to the cooling-water circulation of the internal combustion engine 2 in such a manner that the heat (intrinsic heat) generated by the electric machine 4 is fed to the internal combustion engine for the purpose of an accelerated heating up of the internal combustion engine 2. This additional heat input may be carried out advantageously in a controlled manner as a function of the temperature that exists at the time in the internal combustion engine.

Furthermore, in the event of a corresponding charge state of the energy accumulator device 2a, the electric energy for an additional heat input by the heat exchanger 2a into the internal combustion engine 2 may be carried out by feeding in the energy from the energy accumulator device 2a. To this end, the logic unit 16a may be actuated in a suitable way by the motor control unit. The logic unit 16a may include two actuatable switching means S1, S2, wherein the energy accumulator device 16 can be coupled to the heat exchanger 2a by the first switching means S1. The electric machine 4 can be connected selectively to the energy accumulator device 16 or to the heat exchanger 2a by the second switching means S2.

The five curves K1, . . . , K5 that are shown in FIG. 2 illustrate a start-up operation at different temperatures of the internal combustion engine 2 for a hybrid vehicle. In the cold state of the internal combustion engine (illustrated by the curve K1 at an internal combustion engine temperature $T_{BKM\_1}$ below a specified threshold temperature), the vehicle is driven exclusively by the internal combustion engine 2, generating a torque that is larger than the torque that matches the torque based on the driver's request. In this case, the electric machine 4 is operated in the generator mode by the excessive differential torque that is generated. The electric energy, which is thus generated, may be fed directly to the heat exchanger 2a as a function of the temperature of the internal combustion engine 2. Due to the additional load on the internal combustion engine 2 and the simultaneous additional thermal characteristic in the internal combustion engine 2, the time required for heating up the internal combustion engine to the operating temperature is significantly decreased. Upon reaching a certain state of the operating parameter, such as reaching a specified engine speed $n_{BKM}$, $n_{EM}$ at a specified temperature of the internal combustion engine, the additional load is cast off. When the vehicle is running, the vehicle is operated by the internal combustion engine without having to operate the electric machine 4 as a generator.

Based on the curve K2 at a temperature $T_{BKM\_2}$ of the internal combustion engine, the vehicle is driven exclusively by the internal combustion engine 2 during the start-up operation. Based on the starting temperature $T_{BKM\_2}$, which is higher than the temperature $T_{BKM}$ of the internal combustion engine, an additional load during the start-up operation is not necessary, so that the vehicle is operated in the normal (exclusive) mode of the internal combustion engine from the beginning of the start-up operation.

The curves K3 and K4 proceed from the initial states, in which the internal combustion engine 2 already exhibits a temperature $T_{BKM\_3}$, $T_{BKM\_4}$ above the lower threshold temperature, at which it may already be operated in terms of low emission of harmful substances, so that a proportionally small load reduction of the internal combustion engine 2 is possible by feeding in an additional driving torque by the electric machine 4. At a temperature $T_{BKM\_5}$ of the internal combustion engine, the internal combustion engine has already reached a temperature above the upper threshold temperature, at which the drive may be carried out for a specified period of time exclusively by the electric machine 4 without the internal combustion engine 2 cooling down in such a manner within this period that it could not operate optimally in terms of harmful substances after the expiration of this period of time.

All of the curves K1, . . . , K5 are configured in such a manner that the rest of the drive is carried out as a function of the operating parameters after a certain period of time, or if there exist certain states of the operating parameters (e.g., upon reaching an engine speed $n_{limit\_1}$ , . . . , $n_{limit\_5}$ at a specified temperature of the internal combustion engine), exclusively by the internal combustion engine 2 in an operating state that is optimal in terms of harmful substances.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a hybrid motor vehicle, which includes an internal combustion engine, an electric machine as a propulsive drive, the electric machine being operable in both a motor mode and a generator mode, and a capacitor arrangement as an energy accumulator device for storing electric energy, the method comprising the acts of:
    dividing a torque required at least in a start-up operation for driving the vehicle between the internal combustion engine and the electric machine as a function of operating parameters of the vehicle to generate electric energy, the required torque being based on a request of a driver,
    wherein, below a lower threshold temperature of the internal combustion engine, the torque for driving the vehicle is generated exclusively by the internal combustion engine and the electric machine is driven as an additional load by the internal combustion engine in the generator mode.

2. The method, as claimed in claim 1, wherein torque is divided as a function of the operating parameters, including at least one of a temperature of the internal combustion engine, a temperature of the electric machine, a temperature of the electric accumulator device, the rotational speed of the electric machine and the rotational speed of the internal combustion engine.

3. The method, as claimed in claim 1, wherein, upon reaching the lower threshold temperature of the internal combustion engine, the torque for driving the vehicle is generated jointly by the internal combustion engine and the electric machine.

4. The method, as claimed in claim 3, wherein, after reaching an upper threshold temperature of the internal combustion engine, the torque for driving the vehicle is generated exclusively by the electric machine.

5. The method, as claimed in claim 1, wherein, after reaching an upper threshold temperature of the internal combustion engine, the torque for driving the vehicle is generated exclusively by the electric machine.

6. The method as claimed in claim 1, wherein, in the event that the torque required on the basis of the request of the driver is less than the torque generated by the internal combustion engine, the electric machine is operated in the generator mode.

7. The method, as claimed in claim 1, wherein a charge state of the electric accumulator device is monitored and, in the event that the charge state falls below a lower threshold value, the electric machine is operated in the generator mode and the electric energy that is generated is fed to the electric accumulator device to charge up the electric accumulator device until an upper threshold value of the charge state is reached.

8. The method, as claimed in claim 1, wherein the operating temperature of the internal combustion engine is determined, and the electric energy is fed, as a function of the determined temperature, to an electric heat exchanger for the purpose of a heat input into the internal combustion engine.

9. A method for operating a hybrid motor vehicle, which includes an internal combustion engine, an electric machine as a propulsive drive, the electric machine being operable in both a motor mode and a generator mode, and a capacitor arrangement as an energy accumulator device for storing electric energy, the method comprising the acts of:
    dividing a torque required at least in a start-up operation for driving the vehicle between the internal combustion engine and the electric machine as a function of operating parameters of the vehicle to generate electric energy, the required torque being based on a request of a driver,
    wherein, after reaching an upper threshold temperature of the internal combustion engine, the torque for driving the vehicle is generated exclusively by the electric machine.

10. The method as claimed in claim 9, wherein, in the event that the torque required on the basis of the request of the driver is less than the torque generated by the internal combustion engine, the electric machine is operated in the generator mode.

11. The method, as claimed in claim 9, wherein a charge state of the electric accumulator device is monitored and, in the event that the charge state falls below a lower threshold value, the electric machine is operated in the generator mode; and wherein the electric energy that is generated is fed to the energy accumulator device to charge up the energy accumulator device until an upper threshold value of the charge state is reached.

12. A method for operating a hybrid motor vehicle, which includes an internal combustion engine, an electric machine as a propulsive drive, the electric machine being operable in both a motor mode and a generator mode, and a capacitor arrangement as an energy accumulator device for storing electric energy, the method comprising the acts of:

dividing a torque required at least in a start-up operation for driving the vehicle between the internal combustion engine and the electric machine as a function of operating parameters of the vehicle to generate electric energy, the required torque being based on a request of a driver, wherein the operating temperature of the internal combustion engine is determined, and the electric energy is fed, as a function of the determined temperature, to an electric heat exchanger for the purpose of a heat input into the internal combustion engine.

13. The method, as claimed in claim 12, wherein the electric energy is fed to the heat exchanger from the energy accumulator device or from the electric machine, which is operated in the generator mode.

* * * * *